INVENTOR.
GEORGE V. McCAULEY
BY Dusey & Cole
ATTORNEYS.

June 30, 1936. G. V. McCAULEY 2,045,716
APPARATUS FOR CASTING LARGE GLASS ARTICLES
Filed Feb. 28, 1935 3 Sheets-Sheet 3

INVENTOR.
GEORGE V. McCAULEY
BY
ATTORNEYS.

Patented June 30, 1936

2,045,716

UNITED STATES PATENT OFFICE 2,045,716

APPARATUS FOR CASTING LARGE GLASS ARTICLES

George V. McCauley, Corning, N. Y., assignor to Corning Glass Works, Corning, N. Y., a corporation of New York Application February 28, 1935, Serial No. 8,756

15 Claims. (Cl. 49—39)

This invention relates to apparatus for fabricating glass and more particularly to ceramic refractory molds and kilns for making large castings of molten glass such as discs for telescope mirrors.

Glass has long been used as a material from which to fabricate reflecting telescope mirrors, but heretofore no mirror of a diameter larger than 101 inches and a thickness of 13 inches has been made, this being composed of a glass of low softening temperature and high thermal expansion. The failure to make larger mirrors of glass has been due largely to the difficulties of manufacture which become quite formidable when the size of the mirror is increased much beyond 100 inches with thicknesses much greater than 13 to 15 inches. The manufacturing difficulties have consisted not only in the lack of a suitable method of handling and cooling such large masses of molten glass but also in the lack of a suitable apparatus therefor.

In another application, filed by me of even date herewith, I have disclosed and claimed a method for casting and cooling large masses of molten glass.

The object of this invention is to produce large castings of glass, such as telescope mirrors, which will be free from laps, seams, bubbles and like imperfections.

Another object is to prevent the contamination of the glass with mold material.

Among its features my invention embodies a refractory mold having an open top side and a heating kiln having an open under side supported above and completely enclosing the open side of the mold, said heating kiln having doors through which glass containing ladles may be admitted for introducing molten glass into the mold.

Another feature is a seal between the mold and the kiln to prevent the escape of heat and flame at their junction.

Still another feature is means carried by the kiln to cut off glass tailings from an emptied ladle at a point beyond the inner face of the upper edge of the side wall of the mold.

Other features embody a refractory mold carrying spaced porous refractory cores which have a lower specific gravity than the glass, yieldable means for anchoring the cores to the bottom of the mold in such a manner that they are held against upward movement but may shift laterally in a small degree to relieve any stresses involved in casting and cooling the glass and means for cooling the interior of the cores and their anchors by the use of a reduced air pressure so that gases formed at the glass and core interface will be prevented from forming bubbles or voids in the glass and will pass through the pores of the cores into the surrounding atmosphere.

My invention further resides in the novel construction, combination and arrangement of parts to be more fully described herein, claimed in the appended claims and illustrated in the accompanying drawings, in which:

Figure 3:
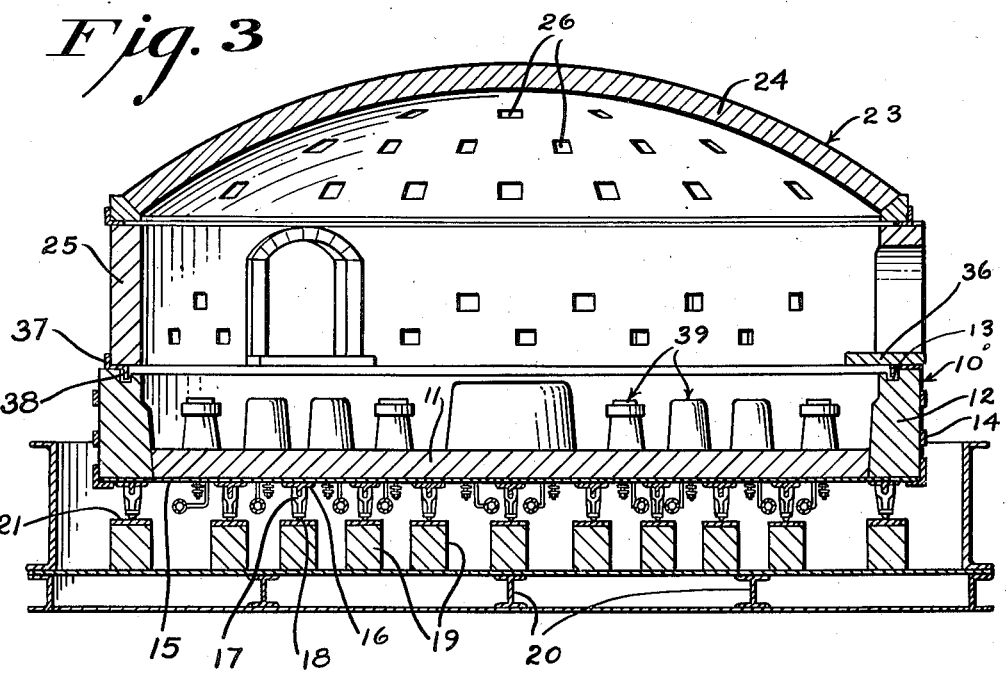
Fig. 3 is a vertical sectional view on the line 3—3 of Fig. 2 showing cores anchored to the bottom of the mold.
Figure 4:
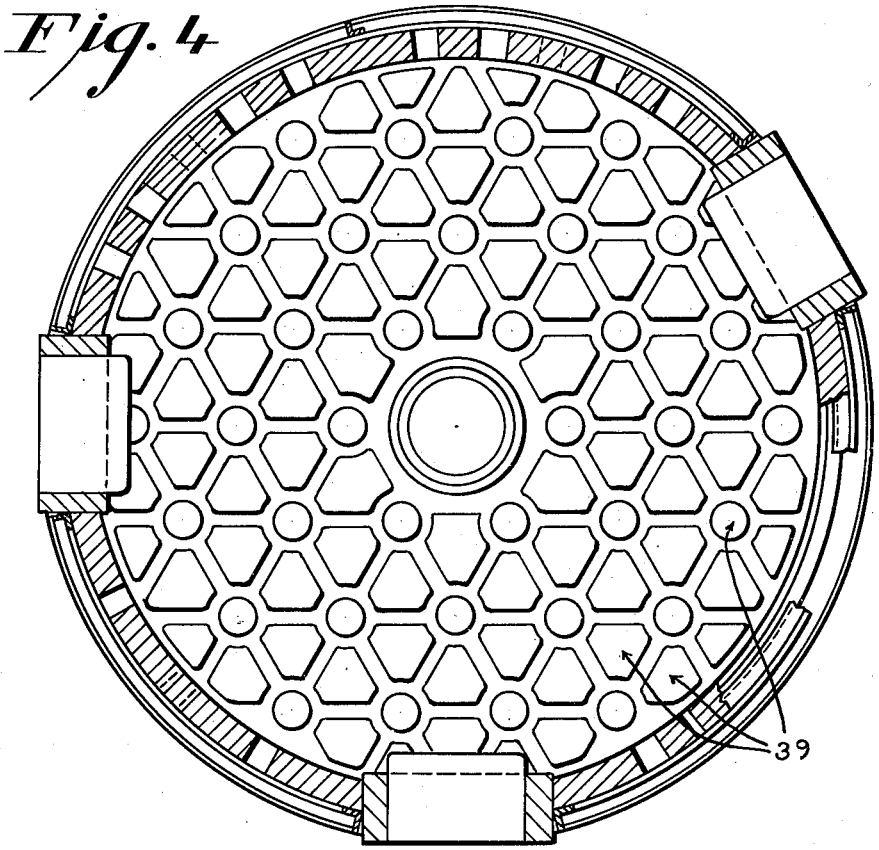
Fig. 4 is a horizontal sectional view on the line 4—4 of Fig. 2 showing the cores in spaced relation to each other and to the side wall of the mold.

Referring to the drawings in detail, a mold designated generally 10 comprises a bottom 11 and upstanding side walls 12. As illustrated in Fig. 3, the upper edges of the side walls are provided with grooves 13 and that portion of the upper edge of each side wall between the groove and the outer face of the wall is of slightly greater height than that portion of the wall between the groove and the inner face of the side wall. The side walls 12 are preferably formed of a ceramic refractory material having high thermal insulating qualities which are held in place by metal bands 14 and the mold bottom 11, like the side walls, is formed of a similar refractory material which is supported on a steel plate 15. At spaced intervals beneath the plates 15 are T-bars 16 to which legs 17 are secured in spaced relation. The lower ends of these legs are provided with steel balls 18 forming casters which rest on metal plates 21 carried upon the upper ends of ceramic refractory piers 19 which are supported on I-beams 20 forming a platform supported upon a carriage to be hereinafter more fully described.

Suspended above the mold 10 on a suitable superstructure 22 is a heating kiln 23 which consists of a dome 24 supported at the upper end of side walls 25. The dome 24 is provided at spaced intervals with ports 26 forming vents for the escape of products of combustion. Ports 27 are formed in the side walls, and introduced through suitable pipes and nozzles 28 into the interior of kiln 23 are combustible gases which, when fired, served to heat the kiln and the mold when the latter is in position illustrated at the left of Fig. 1.

As shown the mold is supported on a movable carriage 29 which is vertically adjustable on screws 30 carried by a chassis 31 which is mounted on wheels 32 run on tracks 33 so that the mold may be withdrawn from its position beneath the heating kiln 23 and removed to a position beneath an annealer 34 which latter forms no part of this invention. Formed at spaced intervals in the side walls of the kiln 23 are doors 35 provided with sills 36 which, as illustrated in Fig. 3, extend inwardly beyond the inner faces of the side walls of the dome and beyond the inner faces of the side walls 12 of the mold. Secured to the lower edges of the side walls 25 of the kiln are angle bars 37 which are formed with depending flanges 38 for entrance into the grooves 13 formed in the upper edges of the side walls of the mold so as to effectively seal the junction of the mold and kiln.

Figure 5:
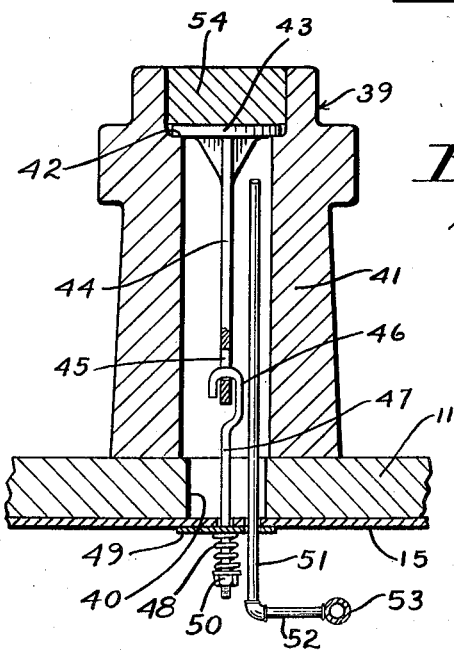
Fig. 5 is an enlarged vertical section of one of the cores showing the anchoring and cooling means.

While it is not essential in casting large ware to provide the casting with reinforcing ribs, it is frequently desirable, particularly when making these articles, to reduce their weight and for this purpose I provide the mold with a plurality of upstanding cores designated generally 39 which are spaced from the side walls of the mold and from each other. In preparing the mold for the use of cores the bottom 11 is provided at spaced intervals with openings 40 through which the core anchors and cooling apparatus are introduced. Fig. 5 illustrates a typical core and anchoring means employed by me and in this illustration the core 39 consists of a porous ceramic refractory body 41 of tubular formation which is provided near its upper end with an internal shoulder 42 upon which an anchoring plate 43 rests. Depending from the anchoring plate is a bar 44 which is pierced near its lower end as at 45 to receive a hook 46 formed at the upper end of a rod 47, the lower end of which projects through an opening formed in the plate 15 and is surrounded by a compression coiled spring 48, the upper end of which abutts a bearing plate 49 while the lower end engages a nut 50 which is threaded on the end of the rod 47 so that the compression of the spring may be varied to suit different conditions. Formed in the plate 15 adjacent the opening through which the rod 47 passes is an opening through which a pipe 51 is introduced into the interior of the core. The upper end of this pipe terminates near the shoulder 42 while its lower end is connected through suitable nipples 52 to a vacuum line 53 by means of which heated air is withdrawn from the interior of the core. After placing the core in position in the mold the open upper end is plugged with a block 54 of similar refractory material.

Figure 1:
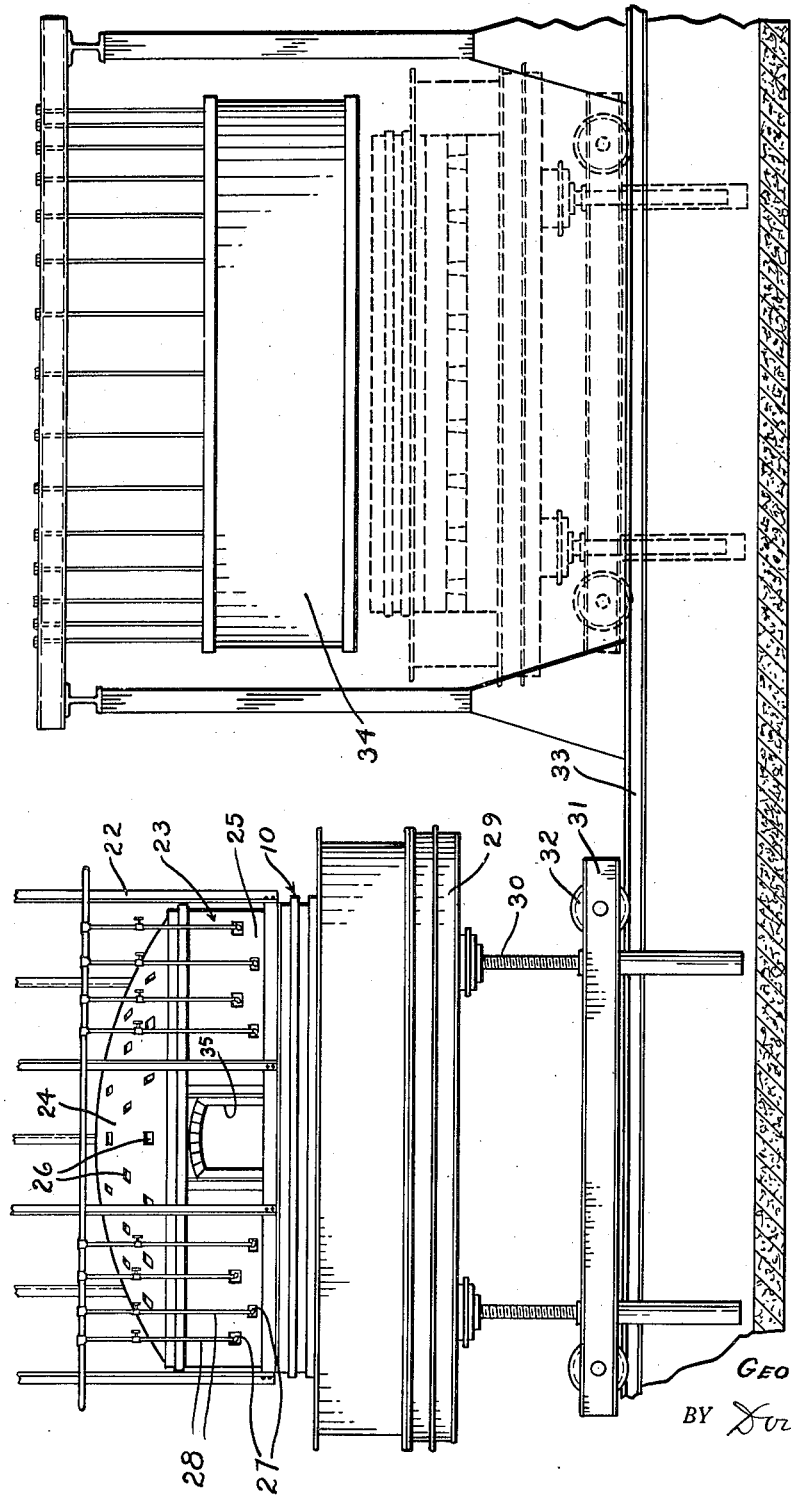
Fig. 1 is an elevation of an apparatus for casting and cooling large articles of molten glass showing a refractory mold, a heating and casting kiln, an annealing kiln and means for transporting the mold from one kiln to the other.
Figure 2:
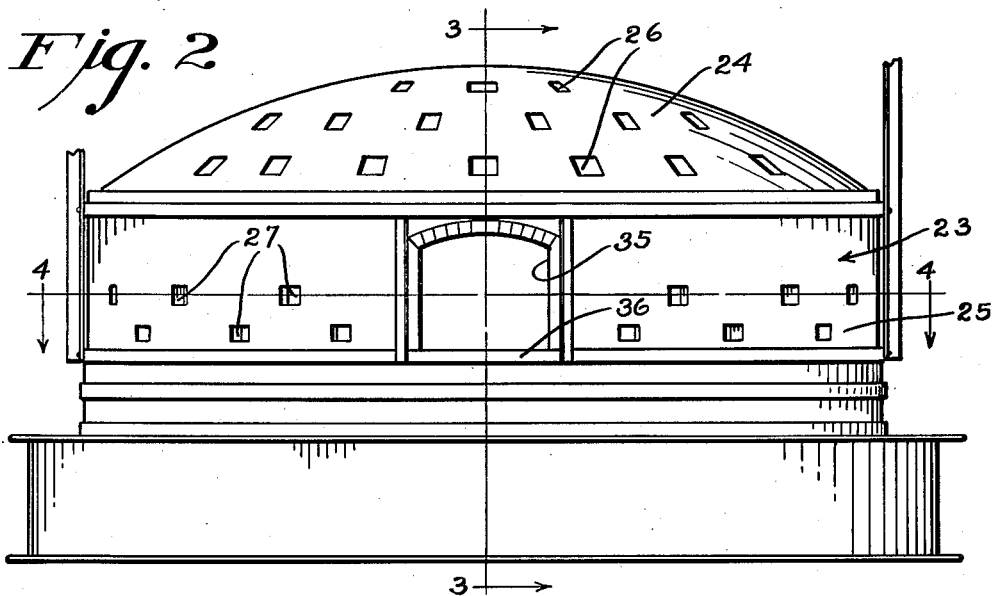
Fig. 2 is an enlarged elevation of the mold and heating kiln shown in Fig. 1.

In operation the mold 10 is positioned beneath the kiln 23 as illustrated in Fig. 1 and a mixture of air and gas is admitted through the pipes 28 and ignited so that flames are directed through the ports 27 and into the interior of the kiln. In this manner the mold is heated and after reaching a predetermined temperature is ready for the introduction of molten glass. The glass is ladled from a suitable supply and the ladles are admitted through the doors 35 in the kiln where they are emptied of a portion of their contents and withdrawn. As is ordinarily experienced in glass house practice, a thread of glass extends between that emptied into the mold and that remaining in the ladle and this thread is engaged with the projecting portions of the sills 36 and is severed below the sill by the fire of the kiln so that later withdrawal of the mold from the kiln is not impeded. After the mold has been filled to the proper level, the fires in the kiln are extinguished and the mold is lowered on its carriage 29 away from its position under the kiln and subsequently transferred to the annealer 34. By reason of the groove 13 in the top of the side walls of the mold and the depending flange 38 on the angle bar 37 carried by the kiln, the parts may be readily separated, though, when the mold is in position beneath the kiln, this depending flange effectively prevents the escape of heated gases and flame at the junction of the mold and the kiln.

While in the foregoing there has been shown and described the preferred embodiment of my invention, it is to be understood that minor changes in the details of construction, combination, and arrangement of parts may be resorted to without departing from the spirit and scope of my invention as claimed.

I claim:

1. In combination a glass casting mold having a bottom and upstanding side walls, a heating kiln having an open under side supported above and completely covering said mold, said kiln having an opening through which molten glass is introduced into the mold and means carried by the heating kiln to intercept glass tailings adhering to the ladle.

2. The combination with a glass casting mold having a bottom and upstanding side walls, of a heating kiln having an open under side supported above and completely covering the mold, said kiln having a ladle admitting opening and a pad forming the sill of said opening, said pad extending into the kiln beyond the upper edge of the inner face of the side wall of the mold.

3. The combination with a glass casting mold having a bottom and an upstanding side wall, of a heating kiln having an open under side supported on the outer edge of the upper face of the side wall, said kiln having a ladle admitting opening, a pad carried by the kiln and resting on the upper edges of the side wall of the mold, said pad forming the sill of said opening and extending into the kiln beyond the inner face of the side wall of the mold, means for maintaining a positive pressure within the kiln and means for sealing the junction between the kiln and the mold.

4. In combination a glass casting mold having a bottom and an upstanding side wall, said side wall being provided with an annular groove in its top face, a heating kiln having an open under side supported above and adapted to enclose the open upper side of the mold, an angle bar surrounding the lower edge of the side walls of the kiln and a depending flange on the angle bar for entrance into the groove in the mold whereby the junction between the mold and kiln is sealed, said heating kiln having a ladle admitting opening, a pad forming the sill of the opening and extending into the kiln beyond the inner face of the side wall of the mold and means for maintaining a positive pressure within the kiln.

5. In combination a glass casting mold having a bottom and upstanding side walls, porous cores extending upwardly from the bottom of the mold in spaced relation to the side walls and to each other and yieldable anchors holding the cores in place in said mold.

6. In combination a glass casting mold having a bottom and upstanding side walls, porous cores extending upwardly from the bottom of the mold in spaced relation to the side walls and to each other, means to anchor the cores to the bottom of the mold and means to cool the core anchors.

7. In combination a glass casting mold having a bottom and upstanding side walls, porous cores extending upwardly from the bottom of the mold in spaced relation to the side walls, yieldable core anchors for holding the cores in position in the mold and means to evacuate the cores and cool the core anchors.

8. In combination a glass casting mold having a bottom and upstanding side walls, porous cores extending upwardly from the bottom of the mold in spaced relation to the side walls and to each other and core anchoring members including springs supported wholly outside of the mold.

9. In combination a glass casting mold having a bottom and upstanding side walls, hollow cores extending upwardly from the bottom of the mold in spaced relation to the side walls and to each other, said cores having a lower specific gravity than the glass, yieldable anchors holding the cores in proper position in the mold and means for cooling the core anchors and evacuating the interior of the cores.

10. In combination a glass casting mold having a bottom and upstanding side walls, hollow cores extending upwardly from the bottom of the mold in spaced relation to each other and means to exhaust heated air from the interiors of the cores.

11. In combination a glass casting mold having a bottom and upstanding side walls, hollow cores extending upwardly from the bottom of the mold in spaced relation to each other, yieldable anchors for the cores and means to exhaust heated air from the interiors of the cores and to cool the anchors.

12. In combination a glass casting mold having a bottom and upstanding side walls, hollow cores extending upwardly from the mold bottom in spaced relation to each other, said cores having a lower specific gravity than the glass, anchors for holding the cores in place in the mold, yieldable means wholly outside of the mold for holding the anchors and means for evacuating the cores and cooling the core anchors.

13. In glass casting apparatus, a horizontal track, a heating kiln having an open under side suspended above the track in spaced relation thereto, a carriage movable along the track, a mold on the carriage, said mold having an open top and means to elevate the mold so that its open top registers with the open under side of the kiln.

14. In glass casting apparatus, a horizontal track, a heating kiln and an annealer suspended in spaced relation to each other and to said track, a carriage movable along said track, a mold on the carriage, said mold having an open top and means to elevate the mold into position to close the under side of the heating kiln, or the annealer, as the case may be.

15. The method of making large glass castings which includes supporting a glass casting mold beneath a heating kiln, introducing molten glass into said mold while the mold is in position under the heating kiln, lowering the mold away from the heating kiln after it has been filled with molten glass, transferring the mold and its contents to a position beneath an annealer and elevating the mold and its contents into position within the annealer.

GEORGE V. McCAULEY.